(12) United States Patent
Takahashi et al.

(10) Patent No.: US 12,139,008 B2
(45) Date of Patent: Nov. 12, 2024

(54) FUEL TANK CAP

(71) Applicants: KAWASAKI MOTORS, LTD., Hyogo (JP); SANKYO KINZOKU CO., LTD., Nagoya (JP)

(72) Inventors: Daisuke Takahashi, Kobe (JP); Daisuke Saeki, Kobe (JP); Kazuhiro Suzuki, Nagoya (JP); Keiichi Araki, Nagoya (JP)

(73) Assignees: Kawasaki Motors, Ltd. (JP); Sankyo Kinzoku Co., Ltd. (JP)

( * ) Notice: Subject to any disclaimer, the term of this patent is extended or adjusted under 35 U.S.C. 154(b) by 372 days.

(21) Appl. No.: 17/527,879

(22) Filed: Nov. 16, 2021

(65) Prior Publication Data

US 2023/0025478 A1 Jan. 26, 2023

Related U.S. Application Data

(63) Continuation of application No. PCT/JP2020/024123, filed on Jun. 19, 2020.

(30) Foreign Application Priority Data

Jun. 24, 2019 (JP) ................. 2019-116522

(51) Int. Cl.
*B60K 15/05* (2006.01)
*B62J 35/00* (2006.01)
*B65D 43/16* (2006.01)

(52) U.S. Cl.
CPC .............. *B60K 15/05* (2013.01); *B62J 35/00* (2013.01); *B65D 43/163* (2013.01); *B60K 2015/053* (2013.01)

(58) Field of Classification Search
CPC .... B60K 2015/053; B60K 15/05; B62J 35/00; B65D 43/163; B65D 43/166; B65D 43/167
See application file for complete search history.

(56) References Cited

U.S. PATENT DOCUMENTS

| | | | |
|---|---|---|---|
| 6,352,295 B1 * | 3/2002 | Leitner | E05D 11/1064 16/296 |
| 6,752,448 B1 * | 6/2004 | Hsu | B60K 15/05 280/834 |
| 7,258,386 B2 * | 8/2007 | Leitner | B60K 15/0406 16/286 |
| 10,710,452 B2 * | 7/2020 | Takashi | B60K 15/05 |

FOREIGN PATENT DOCUMENTS

JP 5201702 B 6/2013

\* cited by examiner

*Primary Examiner* — Nathan J Jenness
*Assistant Examiner* — Jennifer Castriotta
(74) *Attorney, Agent, or Firm* — Snell & Wilmer LLP

(57) ABSTRACT

A fuel tank cap includes: a cap body which opens and closes a fuel supply port of a fuel tank; a ring member which is disposed around the fuel supply port and is shaped so as to surround the cap body; and a hinge member which is coupled to the ring member to support the cap body in a turnable manner between a closed position and an open position. A first peripheral part of the ring member, which is opposed to an outer periphery of the cap body, has a larger dimension in a circumferential direction than a dimension of a second peripheral part of the hinge member, which is opposed to the outer periphery of the cap body. The ring member and the hinge member are made of mutually different materials.

7 Claims, 5 Drawing Sheets

FUEL TANK CAP

CROSS REFERENCE TO THE RELATED APPLICATION

This application is a continuation application, under 35 U.S.C. § 111(a) of international patent application No. PCT/JP2020/024123, filed Jun. 19, 2020, which claims priority to Japanese patent application No. 2019-116522, filed Jun. 24, 2019, the entire disclosures of all of which are herein incorporated by reference as a part of this application.

BACKGROUND OF THE INVENTION

Field of the Invention

The present invention relates to a fuel tank cap which opens and closes a fuel supply port of a fuel tank in a saddle-riding vehicle such as a motorcycle.

Description of Related Art

For example, some saddle-riding vehicles such as motorcycles include a fuel tank cap of a so-called airplane type (for example, Patent Document 1). Such a fuel tank cap includes: a cap body which opens and closes a fuel supply port of a fuel tank; a ring member which is disposed around the fuel supply port and is shaped so as to surround the cap body; and a hinge member which supports the cap body in a turnable manner between a closed position and an open position. In Patent Document 1, the hinge member is made of a metal material, whereas the cap body and the ring member are made of a lightweight material such as a resin material. This aims to secure mechanical strength and to reduce the weight of the cap.

RELATED DOCUMENT

Patent Document

[Patent Document 1] JP Patent No. 5201702

SUMMARY OF THE INVENTION

In Patent Document 1, however, the cap body and the ring member are exposed on an external face, and the hinge member is disposed between these members and the fuel tank. Thus, there is little flexibility in design of the hinge member. In particular, the arm which turns the cap body and the abutment part for the arm are required to be strong; nevertheless, it is difficult to increase the size of the arm and the abutment part because they are located close to the ring member. Although the ring member could be made of a metal material to secure strength, this would increase the weight of the cap and, moreover, could deteriorate the appearance of the cap.

The present invention is to provide a fuel tank cap which has a reduced weight and can enhance the appearance.

In order to achieve the object, a fuel tank cap according to the present invention includes:

a cap body which opens and closes a fuel supply port of a fuel tank;

a ring member which is disposed around the fuel supply port and is shaped so as to surround the cap body; and a hinge member which is coupled to the ring member to support the cap body in a turnable manner between a closed position and an open position, wherein a first peripheral part of the ring member, which is opposed to an outer periphery of the cap body, has a larger dimension in a circumferential direction than a dimension of a second peripheral part of the hinge member, which is opposed to the outer periphery of the cap body, and the ring member and the hinge member are made of mutually different materials.

The ring member may be made of, for example, a resin material, and the hinge member may be made of, for example, a metal material.

According to this constitution, a part of the hinge member constitutes the second peripheral part which is opposed to the outer periphery of the cap body and is not disposed between the cap body and the ring member. This makes it easier to increase the size of the hinge member. Further, since the second peripheral part of the hinge member has a smaller dimension than a dimension of the first peripheral part of the ring member, which covers the outer periphery of the cap body, it is possible to suppress increase in the weight of the tank cap without significantly deteriorating the appearance.

In the present invention, the hinge member may include an arm part which turns about a rotation axis and an abutment part against which the arm part at the open position is abutted, and the abutment part may be included in the second peripheral part. According to this constitution, the abutment part which is required to be strong is included in or form the second peripheral part, and therefore, the size of the abutment part can be increased. This makes it easier to secure the rigidity of the abutment part. Therefore, the arm part can be rigidly supported at the open position.

Where the hinge member includes the arm part, the arm part may include a rotation shaft having the rotation axis, the hinge member may include a hinge support part which supports the rotation shaft, and the abutment part may be located on a ceiling part of the hinge support part. According to this constitution, the arm part can be rigidly supported with a simple structure.

Where the hinge member includes the hinge support part, the hinge member may further include an attachment part which attaches the hinge support part to the fuel tank, and the hinge support part and the attachment part may be offset to each other in a radial direction or in the circumferential direction so as not to overlap with each other in an axial direction. According to this constitution, since the hinge support part and the attachment part are offset to each other in the radial direction or in the circumferential direction, there is a gap extending in the axial direction (vertical direction) between the hinge support part and the attachment part in a plan view. Consequently, the hinge member can be easily formed by die molding in which a die opens and closes in the axial direction (vertical direction).

Where the abutment part is located on the ceiling part, the hinge support part may include: a pair of support walls which are arranged in the circumferential direction and include upper faces coupled to each other through the ceiling part; and reinforcement ribs on outer faces of the support walls in the circumferential direction. This constitution makes it possible to construct the ceiling part with a simple structure and to reinforce the support walls with the reinforcement ribs so as to stably support arm part.

Where the abutment part is located on the ceiling part, the fuel tank cap may further include a shield structure which shields a clearance between the ring member and the ceiling part of the hinge member in a plan view. According to this constitution, the interior cannot be seen through the clearance between the first peripheral part and the second peripheral part, and therefore, the appearance is enhanced.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like or corresponding parts throughout the several views:

DESCRIPTION OF THE EMBODIMENTS

Hereinafter, a preferred embodiment of the present invention will be described with reference to the drawings.

Figure 1:
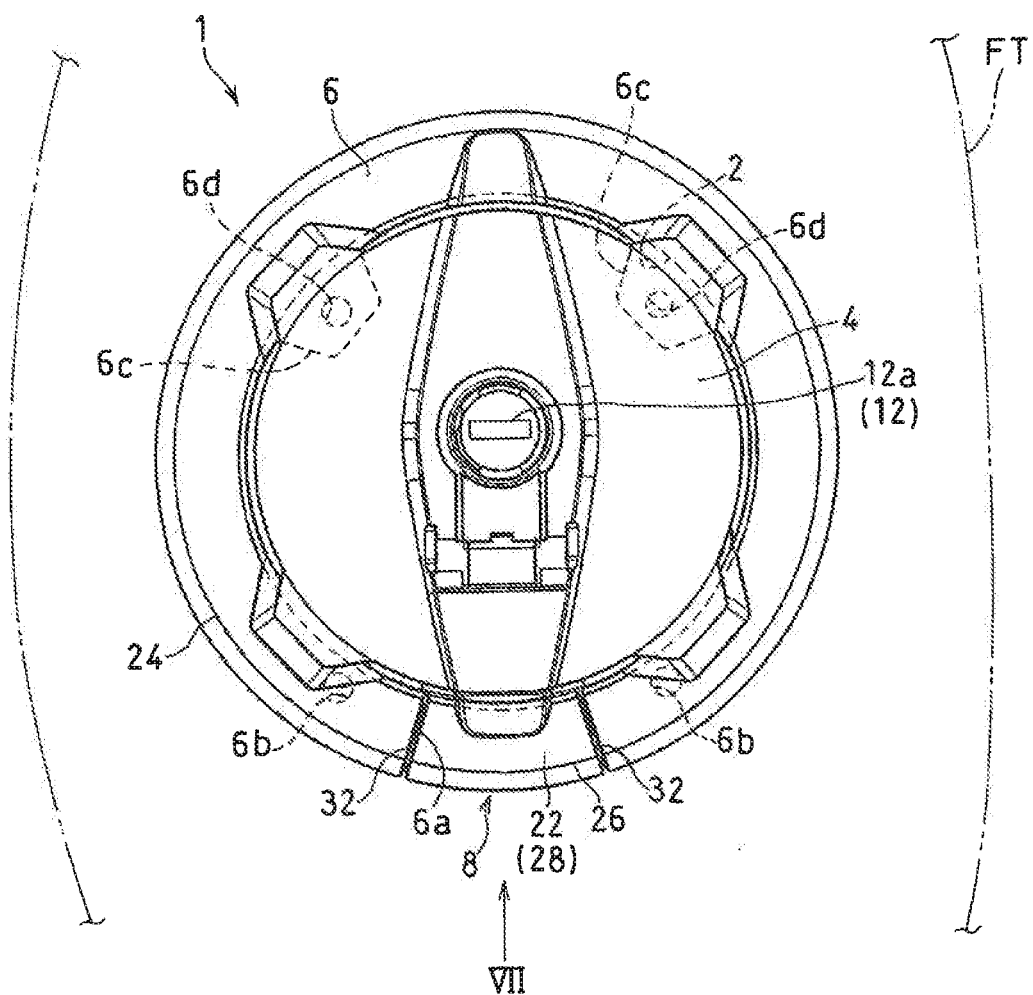
FIG. 1 is a plan view of a fuel tank cap according to first embodiment of the present invention.

FIG. 1 is a plan view of a fuel tank cap according to a first embodiment of the present invention. A fuel tank cap 1 according to the present invention opens and closes a fuel supply port 2 of a fuel tank FT in a saddle-riding vehicle such as a motorcycle. However, the application of the fuel tank cap 1 according to the present invention is not limited to a fuel tank of a motorcycle, and the fuel tank cap may also be applied to fuel tanks of saddle-riding vehicle for use on land such as three-wheelers and four-wheel buggies as well as saddle-riding vehicles for use on water such as small planing boats.

Figure 2:
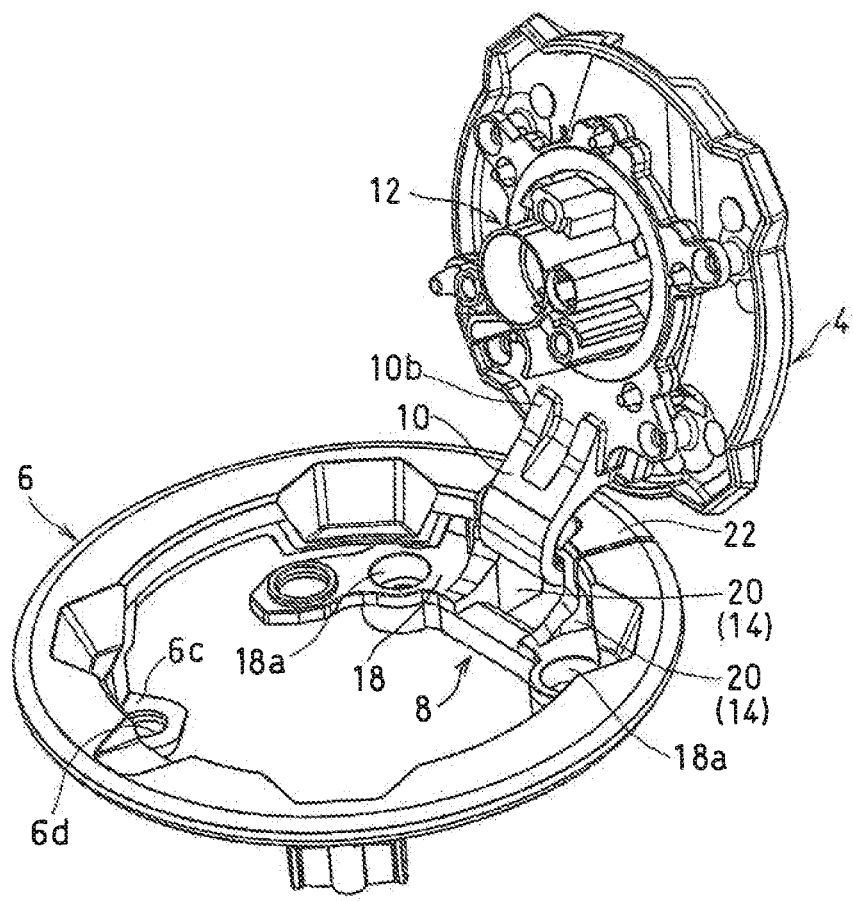
FIG. 2 is a perspective view of the fuel tank cap.

The fuel tank cap 1 includes: a cap body 4 having a disk shape which opens and closes the round fuel supply port 2; a ring member 6 which is disposed around the fuel supply port 2 and is shaped so as to surround the cap body 4; and a hinge member 8 which is coupled to the ring member 6 to support the cap body 4 in a turnable manner between a closed position and an open position. FIG. 1 shows the cap body 4 at the closed position, and FIG. 2 shows the cap body 4 at the open position. The fuel tank cap 1 of the present invention is a fuel tank cap of a so-called airplane type, in which an arm part 10 of the hinge member 8 greatly curves, so that the cap body 4 can be substantially flush with an upper face of the fuel tank FT. This enhances the appearance of the fuel tank cap 1.

The cap body 4 has a shape matching the fuel supply port 2 of FIG. 1. In the present embodiment, the cap body has a round shape in a plan view. A key cylinder 12 is attached to the cap body 4. Specifically, the cap body 4 includes an insertion port 12a for a key on an outer surface (upper face) of the cap body 4, so that the cap body 4 can be locked and unlocked by inserting the key into the insertion port 12a and turning it. The insertion port 12a is covered by a key cover (not illustrated).

The ring member 6 is disposed around the fuel supply port 2 and is shaped so as to surround an outer periphery of the cap body 4. The ring member 6 includes a cut part 6a crossing the ring member 6 in a radial direction. That is, the ring member 6 of the present embodiment has a partially cut annular shape in a plan view. In other words, the ring member 6 has a C shape in a plan view.

In the following description, the "axial direction," "radial direction," and "circumferential direction" means the "axial direction," "radial direction," and "circumferential direction" of the ring member 6, respectively. When the fuel tank cap 1 is attached to the fuel tank FT, the "axial direction" substantially coincides with a vertical direction.

The ring member 6 is made of an inexpensive and lightweight material such as a resin material. In the present embodiment, the ring member 6 is made of 6,6-nylon. However, the material of the ring member 6 is not limited to this and may be, for example, a fiber-reinforced plastic containing glass fibers or an aluminum alloy.

The ring member 6 includes a threaded hole 6b facing the axial direction (vertical direction) in the vicinity of the cut part 6a. In the present embodiment, there are two threaded holes 6b in total, each located adjacent to the cut part 6a in a circumferential direction. Further, the ring member 6 includes attachment pieces 6c protruding inward in the radial direction at substantially opposite positions, in the radial direction, to the respective threaded holes 6b. Each attachment piece 6c includes an insertion hole 6d facing the axial direction (vertical direction).

The hinge member 8 may be made of, for example, a metal material. The hinge member 8 of the present embodiment is made of a zinc alloy. Zinc alloys have high moldability and high strength. However, as long as the hinge member 8 is made of a material different from that of the ring member 6, the material is not limited to a zinc alloy. The material of the hinge member 8 may be, for example, steel or may be a material other than metal. The hinge member 8 may be made of a material having higher strength (higher rigidity) than that of the ring member 6.

Figure 3:
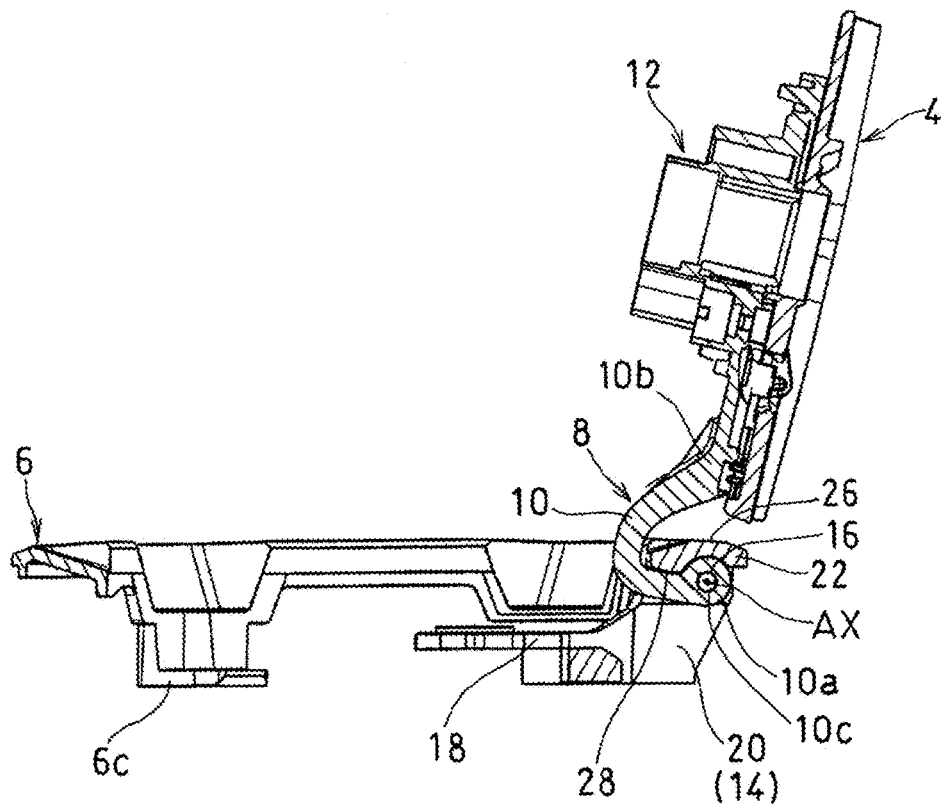
FIG. 3 is a vertical cross-sectional view of the fuel tank cap.

As shown in FIG. 3, the hinge member 8 includes: the arm part 10 which turns about a rotation axis AX; and a hinge support part 14 which supports the arm part 10 in a turnable manner. Specifically, the arm part 10 includes a rotation shaft 16 including the rotation axis AX, and the rotation shaft 16 is supported by the hinge support part 14.

The arm part 10 includes a proximal end portion 10a supported by the hinge support part 14 and a distal end portion 10b to which a key cylinder 12 is attached. The proximal end portion 10a includes a shaft insertion hole 10c. The arm part 10 greatly curves (specifically, substantially 180°) from the proximal end portion 10a to the distal end portion 10b to be connected to the key cylinder 12. The arm part 10 may be integral with or separate from the key cylinder 12.

As shown in FIG. 2, the hinge member 8 includes an attachment part 18 which attaches the hinge support part 14 to the fuel tank FT. In the present embodiment, the hinge support part 14 and the attachment part 18 are offset to each other in the radial direction and in the circumferential direction so as not to overlap with each other in the axial direction. Specifically, the attachment part 18 is offset inward in the radial direction and outward in the circumferential direction with respect to the hinge support part 14.

Figure 4:
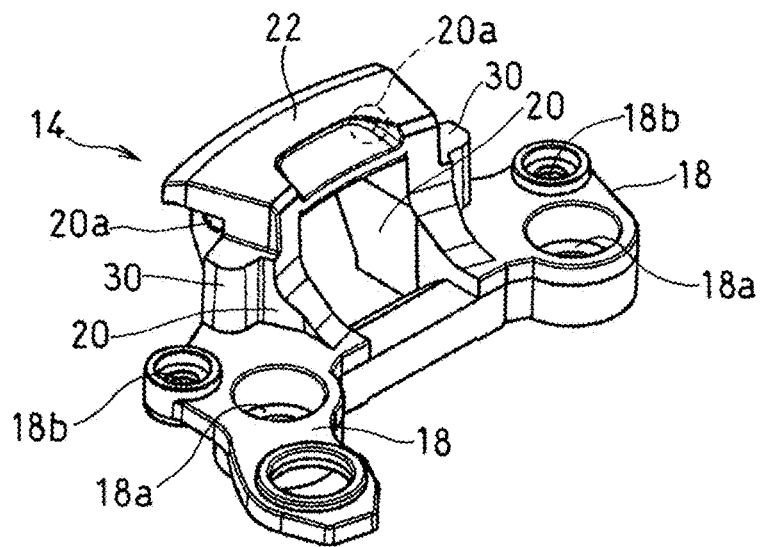
FIG. 4 is a perspective view of a hinge member of the fuel tank cap.

The attachment part 18 includes an insertion hole 18a facing the axial direction (vertical direction). In the present embodiment, there are two insertion holes 18a. However, there may be a greater or smaller number of the insertion holes 18a than two. As shown in FIG. 4, there are ring attachment holes 18b each located in the vicinity of an insertion hole 18a in the hinge support part 14. In the present embodiment, there are ring attachment holes 18b each located at an outer position in the radial direction with respect to one insertion holes 18a.

The hinge support part 14 includes a pair of support walls 20, 20 arranged in the circumferential direction. The support walls 20, 20 extend from the attachment part 18 in the axial direction (upward). Each support wall 20 has an upper end portion including a shaft support hole 20a facing a tangential direction. The support walls 20, 20 of the hinge support part 14 include upper faces coupled to each other through a ceiling part 22.

As shown in FIG. 1, the ceiling part 22 which is a part of the hinge member 8 is located in the cut part 6a. In the present embodiment, in a plan view, most of the outer periphery of the cap body 4 is covered by the ring member 6, and a part of the outer periphery of the cap body 4 is covered by the hinge member 8 (ceiling part 22).

In other words, a first peripheral part 24 of the ring member 6, which is opposed to the outer periphery of the cap body 4, has a larger dimension in the circumferential direction than a dimension of a second peripheral part 26 of the hinge member 8, which is opposed to the outer periphery of the cap body 4. In the present embodiment, the ceiling part 22 is included in or form the second peripheral part 26 of the hinge member 8. In this regard, the first peripheral part 24 may cover, for example, 70% or more of the outer periphery of the cap body 4. If the second peripheral part 26 is too large, the weight of the fuel tank cap 1 would be increased.

The hinge support part 14 includes an abutment part 28 against which the arm part 10 is abutted at an open position as shown in FIG. 3. In the present embodiment, the abutment part 28 is located on the ceiling part 22 of the hinge support part 14. Specifically, the abutment part 28 is located on a lower face of the ceiling part 22. That is, the ceiling part 22 including the abutment part 28 forms the second peripheral part 26.

As shown in FIG. 4, each support wall 20 includes a reinforcement rib 30 on an outer face of that support wall 20 in the circumferential direction. The reinforcement rib 30 of the present embodiment has a substantially quadrangular cylindrical shape. However, the shape of the reinforcement rib 30 is not limited to this. Further, the reinforcement rib 30 may be omitted.

In the present embodiment, the hinge support part 14 and the attachment part 18 of the hinge member 8 are an integrally molded piece by die molding. A direction of demolding corresponds to the axial direction (vertical direction). Specifically, the support walls 20, the ceiling part 22 (abutment part 28), and the reinforcement ribs 30 of the hinge support part 14, as well as the attachment part 18 are integrated by die molding. However, the method of forming the hinge support part 14 and the attachment part 18 is not limited to die molding, and may be, for example, machining.

In order to avoid strong contact between the ring member 6 made of a resin and the hinge member 8 made of a metal as shown in FIG. 1, there are clearances 32 in the circumferential direction between the ring member 6 and the ceiling part 22 of the hinge member 8 in a plan view. The fuel tank cap 1 of the present embodiment includes shield structures 34 which shield the clearances 32 in a plan view.

Figure 7:
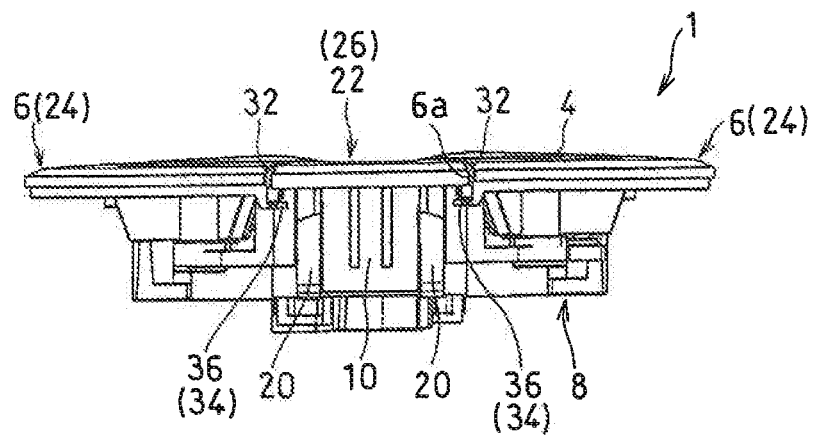
FIG. 7 is a rear view of the fuel tank cap as viewed from the direction indicated by arrow VII in FIG. 1.

As shown in FIG. 7, there are extension portions 36, 36 at respective circumferential edge portions of the ring member 6 which define the cut part 6a. Both extension portions 36, 36 extend downward from the edge portions and then in the circumferential direction so as to approach each other. That is, the extension portions 36 are located below the clearances 32 and the ceiling part 22 of the hinge member 8. In other words, in a plan view, the circumferential edges of the first peripheral part 24 (ring member 6) are lapped with the circumferential edges of the second peripheral part 26 (ceiling part 22). This prevents the interior from being seen through the clearances 32 in a plan view. That is, the extension portions 36 serve as the shield structures 34 which shield the clearances 32 in a plan view.

Figure 8:
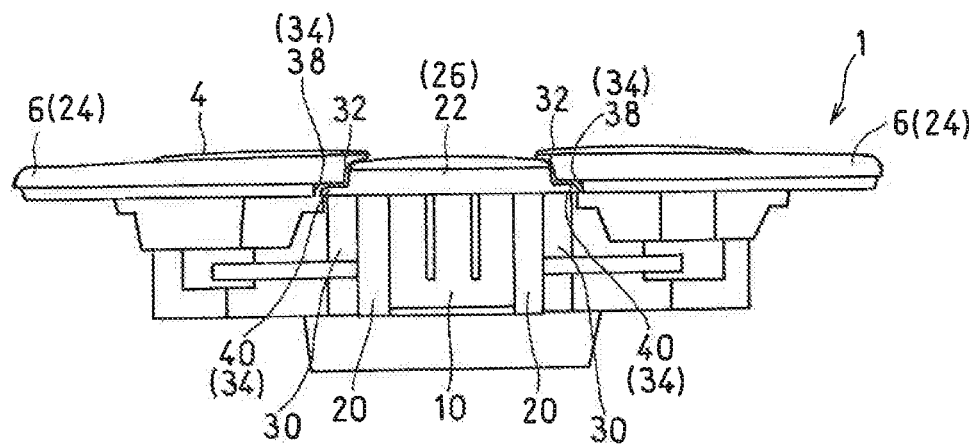
FIG. 8 is a rear view of a variant of the fuel tank cap.

FIG. 8 shows a variant of the shield structures 34. In the illustrated example in FIG. 8, at lower halves of the respective circumferential edge portions of the ring member 6 which define the cut part 6a, there are recess parts 38 which are recessed inward in the circumferential direction. On the other hand, at lower halves of respective circumferential edge portions of the ceiling part 22 of the hinge member 8, there are projection parts 40 which project outward in the circumferential direction.

Thus, also in the variant of FIG. 8, the circumferential edges of the first peripheral part 24 (ring member 6) are lapped with the circumferential edges of the second peripheral part 26 (ceiling part 22) in a plan view. This prevents the interior from being seen through the clearances 32 in a plan view. That is, the recess parts 38 of the ring member 6 and the projection parts 40 of the ceiling part 22 serve as the shield structures 34 which shield the clearances 32 in a plan view.

In the example of FIG. 8, the ring member 6 includes the recess parts 38, and the ceiling part 22 includes the projection parts 40, which arrangement may be reversed. That is, the ring member 6 may include the projection parts, and the ceiling part 22 may include the recess parts. Further, the recess parts 38 and the projection parts 40 may be omitted, and the reinforcement ribs 30 may be positioned below the clearances 32. In this case, the reinforcement ribs 30 serve as the shield structures 34 which shield the clearances 32 in a plan view.

The procedure of assembling/attaching the fuel tank cap 1 will be described. First, the rotation shaft 16 of FIG. 3 is inserted sequentially into the shaft support hole 20a (FIG. 4) of one of the support walls 20, the shaft insertion hole 10c of the proximal end portion 10a of the arm part 10, and then the shaft support hole 20a of the other of the support walls 20. Thus, the arm part 10 and the hinge support part 14 are coupled to each other so as to be assembled into the hinge member 8.

Then, the cap body 4 is attached to the key cylinder 12 which is coupled to the arm part 10. The cap body 4 and the key cylinder 12 are coupled to each other by, for example, fastening members (not illustrated) such as a screw body. Further, the ring member 6 is attached to the hinge member 8. Specifically, the fastening members (not illustrated) such as a screw body are inserted from a lower side into the respective ring attachment holes 18b of the hinge support part 14 in FIG. 4 and are fastened to the respective threaded holes 6b of the ring member 6 in FIG. 1. Thus, the fuel tank cap 1 is assembled.

The fuel tank cap 1 is attached to the fuel tank FT. Specifically, fastening members (not illustrated) such as bolts are inserted from an upper side into the respective insertion holes 18a of the hinge support part 14 in FIG. 4 and are fastened to the respective threaded holes (not illustrated) of the fuel tank FT in FIG. 1. Similarly, fastening members (not illustrated) such as bolts are inserted from the upper side into the insertion holes 6d in the respective attachment pieces 6c of the ring member 6 and are fastened to threaded holes (not illustrated) in the fuel tank FT. Thus, the fuel tank cap 1 is attached to the fuel tank FT.

According to this constitution, the hinge member 8 which is required to be rigid is made of a metal material, and the ring member 6 which is a design article is made of a resin material. Further, the ceiling part 22 which is a part of the hinge member 8 is included in the second peripheral part 26 which is opposed to the outer periphery of the cap body 4, and is not disposed between the cap body and the ring member. This makes it easier to increase the size of the hinge member 8. Further, since the second peripheral part 26 of the hinge member 8 has a smaller dimension in the circumferential direction than a dimension of the first peripheral part 24 of the ring member 6, which covers the outer periphery of the cap body 4, it is possible to suppress increase in the weight of the tank cap 1 without significantly deteriorating the appearance.

The hinge support part 14 which supports the rotation shaft 16 of the arm part 10 as shown in FIG. 3 includes the pair of support walls 20, 20 arranged in the circumferential direction as shown in FIG. 4, and the upper faces of the support walls 20, 20 are coupled to each other through the ceiling part 22. Further, the ceiling part 22 includes, on the lower part of the ceiling part 22, the abutment part 28 against which the arm part 10 at the open position is abutted as shown in FIG. 3, and the ceiling part 22 including the abutment part 28 is included in the second peripheral part 26. Thus, the abutment part 28 (ceiling part 22) which is required to be strong is included in the second peripheral part 26, and therefore, the size of the abutment part 28 can be increased. This makes it easier to secure the rigidity of the abutment part 28. Therefore, the arm part 10 can be rigidly supported at the open position.

The cap body 4 is a heavy component as it includes the key cylinder 12 etc. Therefore, the cap body 4 creates a large load upon an opening operation, so that load resistance (rigidity) of the abutment part 28 is important. Conventionally, the arm part 10 is abutted against upper end portions of the pair of support walls. In this case, contact of the arm part 10 against the support walls takes place at points, making it difficult to secure the load resistance (rigidity). In addition, the support walls are located close to the ring member 6, so that it was difficult to connect the pair of support walls through the ceiling part. In particular, if the surface (outer face) of the ring member 6 is finished into a smooth surface with little unevenness, the ring member 6 would partially have a small thickness, and if the thickness of the ring member 6 is made uniform, the outer face of the fuel tank cap 1 would be partially raised, which leads to deterioration in the appearance.

In the above-described constitution, the upper faces of the support walls 20, 20 in FIG. 1 are coupled to each other through the ceiling part 22, and the ceiling part 22 is a part (second peripheral part 26) of the outer face of the fuel tank cap 1. Thus, the arm part 10 in FIG. 3 comes into surface (line) contact with the abutment part 28 on the lower part of the ceiling part 22. This makes it easier to secure the load resistance (rigidity) of the abutment part 28. Further, the attachment part 18 to the vehicle body and the key cylinder 12 as shown in FIG. 2 are constructed in the same manner as conventional ones, so that the fuel tank cap 1 can be attached to an existing fuel tank FT, making it possible to continue to use the existing cap body 4.

Figure 5:
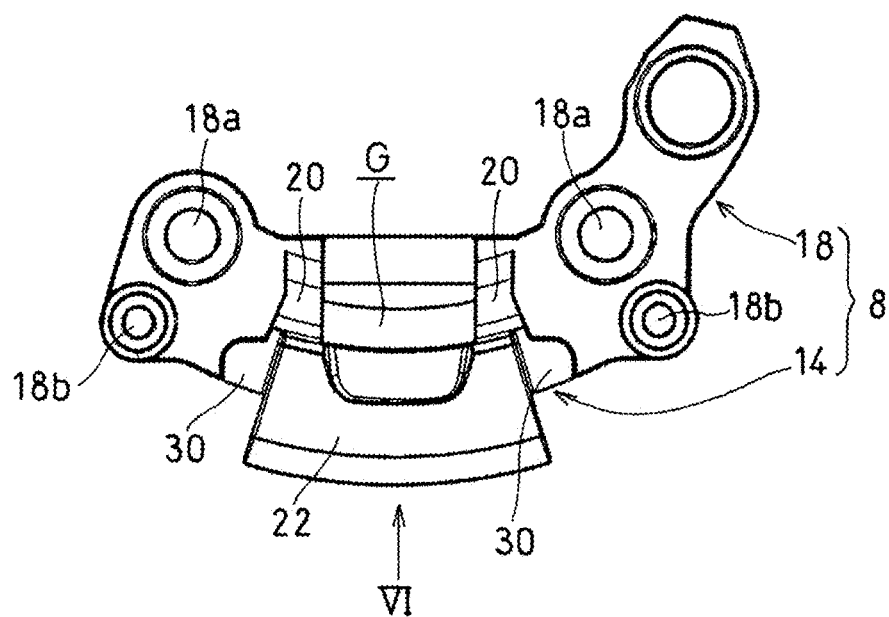
FIG. 5 is a plan view of the hinge member.

As shown in FIG. 5, the hinge support part 14 of the hinge member 8 and the attachment part 18 are offset to each other in the radial direction and in the circumferential direction so as not to overlap with each other in the axial direction. In particular, since the hinge support part 14 and the attachment part 18 are offset to each other in the radial direction, there is a gap G extending in the axial direction between the ceiling part 22 and the attachment part 18 in a plan view. Consequently, the hinge member 8 can be easily formed by die molding in which a die opens and closes in the vertical direction. As shown in FIG. 1, the first peripheral part 24 of the ring member 6 has a larger dimension than a dimension of the second peripheral part 26 of the hinge member 8. If the ceiling part 22 (second peripheral part 26) is too large, the weight of the fuel tank cap 1 would be increased, and the ceiling part 22 would be difficult to demold in die demolding. Therefore, the ceiling part 22 (second peripheral part 26) has a minimum size so as to suppress weight increase and manufacturing costs.

Figure 6:
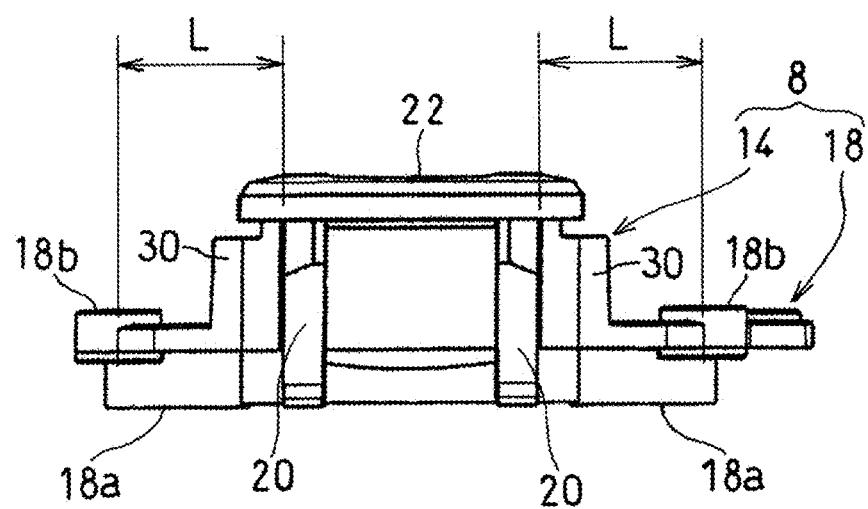
FIG. 6 is a rear view of the hinge member as viewed from the direction indicated by arrow VI in FIG. 5.

As shown in FIG. 6, the reinforcement ribs 30 are located on the outer faces, in the circumferential direction, of the support walls 20, 20. In order to secure the strength of the ceiling part 22 (abutment part 28), it is advantageous to reduce a distance L between a support wall 20 and a ring attachment hole 18b at which the hinge support part 14 is coupled to the ring member 6. Structurally, even where the distance L is increased, the support walls 20 are reinforced by the reinforcement ribs 30, and therefore, the arm part 10 can be stably supported.

As shown in FIG. 7 and FIG. 8, there are the shield structures 34 which shield the clearances 32 between the ring member 6 and the ceiling part 22 of the hinge member 8 in a plan view. This prevents the interior from being seen through the clearances 32 between the first peripheral part 24 and the second peripheral part 26, and therefore, the appearance is enhanced.

The present invention is not limited to the above embodiment, and various additions, modifications, or deletions may be made without departing from the scope of the invention. For example, although the above description of the embodiment is made with reference to a case where the hinge support part 14 and the attachment part 18 are offset to each other in the radial direction and in the circumferential direction, they may be offset to each other only in the radial direction or in the circumferential direction. Also, although the above description refers to the shield structures 34 which shield the clearances 32 between the ring member 6 and the hinge member 8, such shield structures 34 may be omitted. Accordingly, such variants are included within the scope of the present invention.

REFERENCE NUMERALS

1 . . . fuel tank cap
2 . . . fuel supply port
4 . . . cap body
6 . . . ring member
8 . . . hinge member
10 . . . arm part
14 . . . hinge support part
16 . . . rotation shaft
18 . . . attachment part
20 . . . support wall
22 . . . ceiling part
24 . . . first peripheral part 26 . . . second peripheral part
28 . . . abutment part
30 . . . reinforcement rib
32 . . . clearance
34 . . . shield structure
AX . . . rotation axis
FT . . . fuel tank

What is claimed is:

1. A fuel tank cap comprising:
a cap body which opens and closes a fuel supply port of a fuel tank;
a ring member which is disposed around the fuel supply port and is shaped so as to surround the cap body; and
a hinge member which is coupled to the ring member to support the cap body in a turnable manner between a closed position and an open position,
wherein a first peripheral part of the ring member, which is opposed to an outer periphery of the cap body, has a larger dimension in a circumferential direction than a dimension of a second peripheral part of the hinge member, which is opposed to the outer periphery of the cap body,
the first peripheral part of the ring member includes a cut part therein, and has a C-shape in a plan view,
the second peripheral part is located in the cut part of the first peripheral part, and
the ring member and the hinge member are made of mutually different materials.

2. The fuel tank cap as claimed in claim 1, wherein the ring member is made of a resin material, and the hinge member is made of a metal material.

3. A fuel tank cap comprising:
a cap body which opens and closes a fuel supply port of a fuel tank;
a ring member which is disposed around the fuel supply port and is shaped so as to surround the cap body; and
a hinge member which is coupled to the ring member to support the cap body in a turnable manner between a closed position and an open position,
wherein a first peripheral part of the ring member, which is opposed to an outer periphery of the cap body, has a larger dimension in a circumferential direction than a dimension of a second peripheral part of the hinge member, which is opposed to the outer periphery of the cap body,
the ring member and the hinge member are made of mutually different materials,
the hinge member includes an arm part which turns about a rotation axis and an abutment part against which the arm part, at the open position, is abutted, and
the abutment part is included in the second peripheral part.

4. The fuel tank cap as claimed in claim 3, wherein the arm part includes a rotation shaft having the rotation axis,
the hinge member includes a hinge support part which supports the rotation shaft, and
the abutment part is located on a ceiling part of the hinge support part.

5. The fuel tank cap as claimed in claim 4, wherein the hinge member further includes an attachment part which attaches the hinge support part to the fuel tank, and
the hinge support part and the attachment part are offset to each other in a radial direction or in the circumferential direction so as not to overlap with each other in an axial direction.

6. The fuel tank cap as claimed in claim 4, wherein the hinge support part includes:
a pair of support walls which are arranged in the circumferential direction and include upper faces coupled to each other through the ceiling part; and
reinforcement ribs on outer faces of the support walls in the circumferential direction.

7. The fuel tank cap as claimed in claim 4, further comprising a shield structure which shields a clearance between the ring member and the ceiling part of the hinge member in a plan view.

* * * * *